(12) United States Patent
Cho et al.

(10) Patent No.: US 9,568,796 B2
(45) Date of Patent: Feb. 14, 2017

(54) LIQUID CRYSTAL DISPLAY AND MANUFACTURING METHOD THEREOF

(71) Applicant: Samsung Display Co., Ltd., Yongin, Gyeonggi-Do (KR)

(72) Inventors: Se Hyoung Cho, Seoul (KR); Mee Hye Jung, Suwon-si (KR); Sun Hwa Lee, Andong-si (KR); Kwang-Chul Jung, Seongnam-si (KR); Chong Chul Chai, Seoul (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 345 days.

(21) Appl. No.: 13/890,585

(22) Filed: May 9, 2013

(65) Prior Publication Data

US 2014/0132867 A1 May 15, 2014

(30) Foreign Application Priority Data

Nov. 14, 2012 (KR) ........................ 10-2012-0128780

(51) Int. Cl.
*G02F 1/1368* (2006.01)
*G02F 1/1333* (2006.01)
(Continued)

(52) U.S. Cl.
CPC ........... *G02F 1/1368* (2013.01); *G02F 1/1341* (2013.01); *G02F 1/133377* (2013.01); *G02F 1/136227* (2013.01); *G02F 2001/136222* (2013.01)

(58) Field of Classification Search
CPC .............. G02F 1/1368; G02F 1/136286; G02F 1/136227; G02F 1/1334; G02F 1/1341; G02F 2001/136295; G02F 1/13439; G02F 1/133377; G02F 1/133371; G02F 2201/50; G02F 2201/124; G02F 1/133305; G02F 1/134336; G02F 2001/133368; G02F 2001/136222; H01L 27/124; H01L 29/78618; H01L 27/3248
(Continued)

(56) References Cited

U.S. PATENT DOCUMENTS 6,917,394 B2 7/2005 Song et al.
7,015,984 B2 3/2006 Song et al.
(Continued)

FOREIGN PATENT DOCUMENTS

EP 0294900 6/1988
EP 2472311 A1 7/2012
(Continued)

OTHER PUBLICATIONS

The Extended European Search Report for European Patent Application No. 13167995.3-1904 dated Apr. 14, 2014.

*Primary Examiner* — Paisley L Arendt
*Assistant Examiner* — Angela Davison
(74) *Attorney, Agent, or Firm* — Cantor Colburn LLP

(57) ABSTRACT

A liquid crystal display includes: a substrate; a thin film transistor on the substrate; a pixel electrode connected with a terminal of the thin film transistor; a microcavity on the pixel electrode, and including a plurality of regions corresponding a pixel area; a liquid crystal layer in the microcavity; a liquid crystal injection hole exposing the microcavity; a common electrode on the microcavity; a supporting member on the common electrode; and a capping layer on the supporting member and covering the liquid crystal injection hole. The pixel electrode is connected with the terminal of the thin film transistor through a contact hole, and the contact hole is within the pixel area.

24 Claims, 16 Drawing Sheets

(51) Int. Cl.
*G02F 1/1341* (2006.01)
*G02F 1/1362* (2006.01)

(58) Field of Classification Search
USPC .................. 349/154–157, 138, 86, 189, 190
See application file for complete search history.

(56) References Cited

U.S. PATENT DOCUMENTS

| | | | |
|---|---|---|---|
| 7,349,036 B2 | 3/2008 | Hong | |
| 7,387,905 B2 | 6/2008 | Kim | |
| 2009/0303423 A1* | 12/2009 | Kim | G02F 1/13394 349/110 |
| 2010/0149448 A1* | 6/2010 | Kim | G02F 1/133707 349/42 |
| 2011/0228207 A1 | 9/2011 | Lee et al. | |
| 2012/0062448 A1* | 3/2012 | Kim | G02F 1/133377 345/55 |

FOREIGN PATENT DOCUMENTS

| | | |
|---|---|---|
| JP | 2004-246284 A | 9/2004 |
| JP | 2007-248736 A | 9/2007 |
| KR | 1020090072391 A | 7/2009 |
| KR | 1020090075400 A | 7/2009 |
| KR | 1020120064722 A | 6/2012 |
| KR | 1020130084842 A | 7/2013 |
| WO | 9845751 | 10/1998 |
| WO | 2005045513 A1 | 5/2005 |

* cited by examiner

LIQUID CRYSTAL DISPLAY AND MANUFACTURING METHOD THEREOF

This application claims priority to Korean Patent Application No. 10-2012-0128780 filed on Nov. 14, 2012, and all the benefits accruing therefrom under 35 U.S.C. §119, the entire contents of which are incorporated herein by reference.

BACKGROUND (a) Field

The invention relates to a liquid crystal display and a manufacturing method thereof.

(b) Description of the Related Art

A liquid crystal display, which is one of a number of widely used flat panel displays, includes two sheets of display panels in which field generating electrodes, such as a pixel electrode, a common electrode, and the like, are disposed, and a liquid crystal layer interposed between the display panels.

Voltage is applied to the field generating electrodes to generate an electric field in the liquid crystal layer, which determines orientation of liquid crystal molecules of the liquid crystal layer and controls polarization of incident light to display an image.

A nano crystal display ("NCD") liquid crystal display is an apparatus that is manufactured by forming a sacrificial layer of organic materials, and the like, forming a supporting member thereon and then removing the sacrificial layer, and filling a liquid crystal in an empty space formed by removing the sacrificial layer.

SUMMARY

One or more exemplary embodiment of the invention provides a liquid crystal display capable of reducing or effectively preventing an electrical short defect between a pixel electrode and a common electrode, and a manufacturing method thereof.

An exemplary embodiment of the invention provides the liquid crystal display including: a substrate; a thin film transistor on the substrate; a pixel electrode connected with a terminal of the thin film transistor; a microcavity on the pixel electrode, and comprising a liquid crystal injection hole exposing the microcavity; a common electrode on the microcavity; a supporting member on the common electrode; and a capping layer on the supporting member and covering the liquid crystal injection hole. A liquid crystal layer is disposed in the microcavity. The pixel electrode is connected with the terminal of the thin film transistor through a contact hole and the contact hole is disposed within a pixel area.

The liquid crystal display may further include a groove between the microcavity and exposing the liquid crystal injection hole. The common electrode in the pixel area may include a projection protruded toward a region over the substrate on which the groove is disposed.

The projection of the common electrode may be bent at an end portion of the common electrode in the pixel area.

A cross-sectional distance at which the projection of the common electrode protrudes toward the substrate may be smaller than a thickness of the liquid crystal layer in the microcavity.

The liquid crystal display may further include an insulating layer on the common electrode, and an end portion of the insulating layer is connected to a projection corresponding to the projection of the common electrode.

The projection of the common electrode and the projection of the insulating layer may overlap each other.

The pixel electrode may include a cross-shape stem portion defined by a horizontal stem portion and a vertical stem portion crossing the horizontal stem portion; and a plurality of branch portions extending from the cross-shape stem portion.

The terminal of the thin film transistor connected with the pixel electrode may be elongated in a same direction as that of the vertical stem portion.

The contact hole may be disposed at an intersecting point at which the horizontal stem portion and the vertical stem portion intersect each other.

The liquid crystal display may further include a gate line on the substrate; a semiconductor layer including a channel region; and a data wire layer including a source electrode and a drain electrode overlapping an edge of the semiconductor layer, and a data line connected with the source electrode. The semiconductor layer may have a same plane shape as the data wire layer, except for the channel region.

The liquid crystal display may further include a light blocking pattern on the substrate. The light blocking pattern may be elongated in a same direction as that of the drain electrode.

The light blocking pattern may be disposed at a same layer as the gate line.

The liquid crystal display may include a groove between the microcavity and exposing the liquid crystal injection hole. The capping layer may fill the groove to cover the liquid crystal injection hole.

The liquid crystal display may include a gate line on the substrate and elongated in a first direction; and a data line elongated in a second direction crossing the first direction. The groove may be elongated in the first direction.

The liquid crystal display may further include an alignment film between the pixel electrode and the microcavity or between the common electrode and the microcavity.

Another exemplary embodiment of the invention provides a manufacturing method of a liquid crystal display, the method including: providing a thin film transistor on a substrate; providing a pixel electrode connected with a terminal of the thin film transistor; providing a sacrificial layer on the pixel electrode; providing a common electrode on the sacrificial layer; providing a supporting member on the common electrode; removing the sacrificial layer to form a microcavity including a liquid crystal injection hole which exposes the microcavity; injecting a liquid crystal material into the microcavity to form a liquid crystal layer; and providing a capping layer on the supporting member so as to cover the liquid crystal injection hole. The pixel electrode is connected with the terminal of the thin film transistor through a contact hole and the contact hole is disposed within the pixel area.

The manufacturing method of a liquid crystal display may further include: patterning the supporting member to form a groove between the microcavity and exposing the liquid crystal injection hole; providing an insulating layer on the supporting member; and patterning the insulating layer and the common electrode to expose the sacrificial layer.

In the patterning the insulating layer, end portions of the common electrode and the insulating layer may be protruded toward the groove.

In the forming the microcavity, the protruded end portions of the common electrode and the insulating layer may be inclined toward the substrate after the forming of the microcavity.

A cross-sectional distance at which the inclined protruded end portions of the common electrode and the after the forming of the microcavity layer protrude toward the substrate is smaller than a thickness of the liquid crystal layer in the microcavity.

The pixel electrode may include a cross-shape stem portion defined by a horizontal stem portion, and a vertical stem portion crossing the horizontal stem portion; and a plurality of branch portions extending from the cross-shape stem portion.

The terminal of the thin film transistor connected with the pixel electrode may be elongated in a same direction as that of the vertical stem portion.

The contact hole may be disposed at an intersecting point at which the horizontal stem portion and the vertical stem portion intersect each other.

The manufacturing method of a liquid crystal display may further include providing a gate line on the substrate; providing a semiconductor layer including a channel region; and providing a data wire layer including a source electrode and a drain electrode overlapping an edge of the semiconductor layer, and a data line connected with the source electrode. The semiconductor layer may have a same plane shape as the data wire layer, except for the channel region.

The manufacturing method of a liquid crystal display may further include providing a light blocking pattern disposed on the substrate. The light blocking pattern may be elongated in a same direction as that of the drain electrode.

The light blocking pattern may be disposed in a same layer as the gate line.

According to one or more exemplary embodiments of the invention, the pixel electrode is not disposed at a portion overlapping the projection of the common electrode, thereby preventing an electrical short defect between the pixel electrode and the common electrode.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
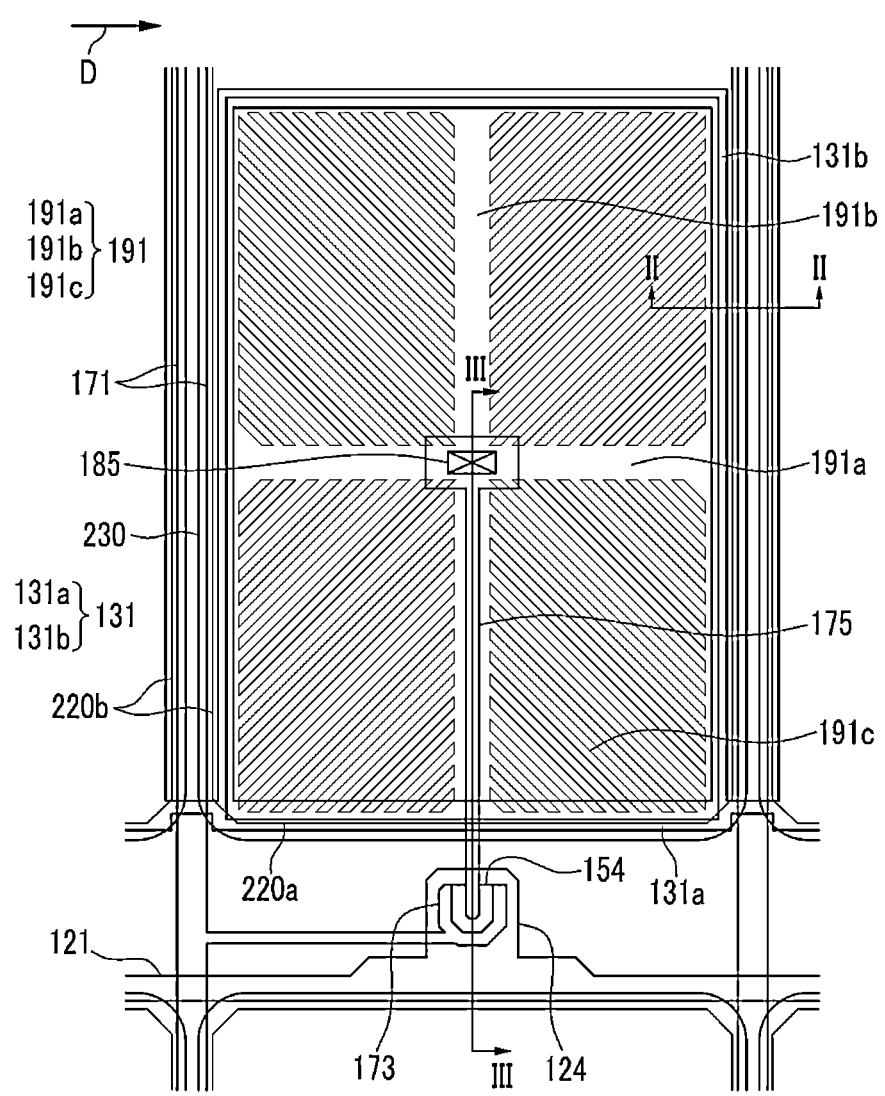
FIG. 1 is a plan view illustrating an exemplary embodiment of a liquid crystal display according to the invention.

Exemplary embodiment of the invention will be described in detail with the accompanying drawings. As those skilled in the art would realize, the described embodiments may be modified in various different ways, all without departing from the spirit or scope of the invention. On the contrary, exemplary embodiments introduced herein are provided to make disclosed contents thorough and complete and sufficiently transfer the spirit of the invention to those skilled in the art.

In the drawings, the thickness of layers, films, panels, regions, etc., are exaggerated for clarity. It will be understood that when a layer is referred to as being "on" another layer or substrate, it can be directly on the other layer or substrate, or intervening them may also be present. Like reference numerals designate like elements throughout the specification. As used herein, connected may refer to elements being physically and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

A manufacturing method of a nano crystal display such as a liquid crystal display includes forming an overcoat on a supporting member and then patterning a common electrode and the overcoat, so as to expose the sacrificial layer. In this manufacturing method, when a mis-alignment is generated, ends of the common electrode and the overcoat may remain in a shape of a projection. An electrical short defect may occur between the projection-shaped common electrode and the pixel electrode in a subsequent process of the manufacturing method, due to a sagging phenomenon of the projection-shaped common electrode.

Figure 2:
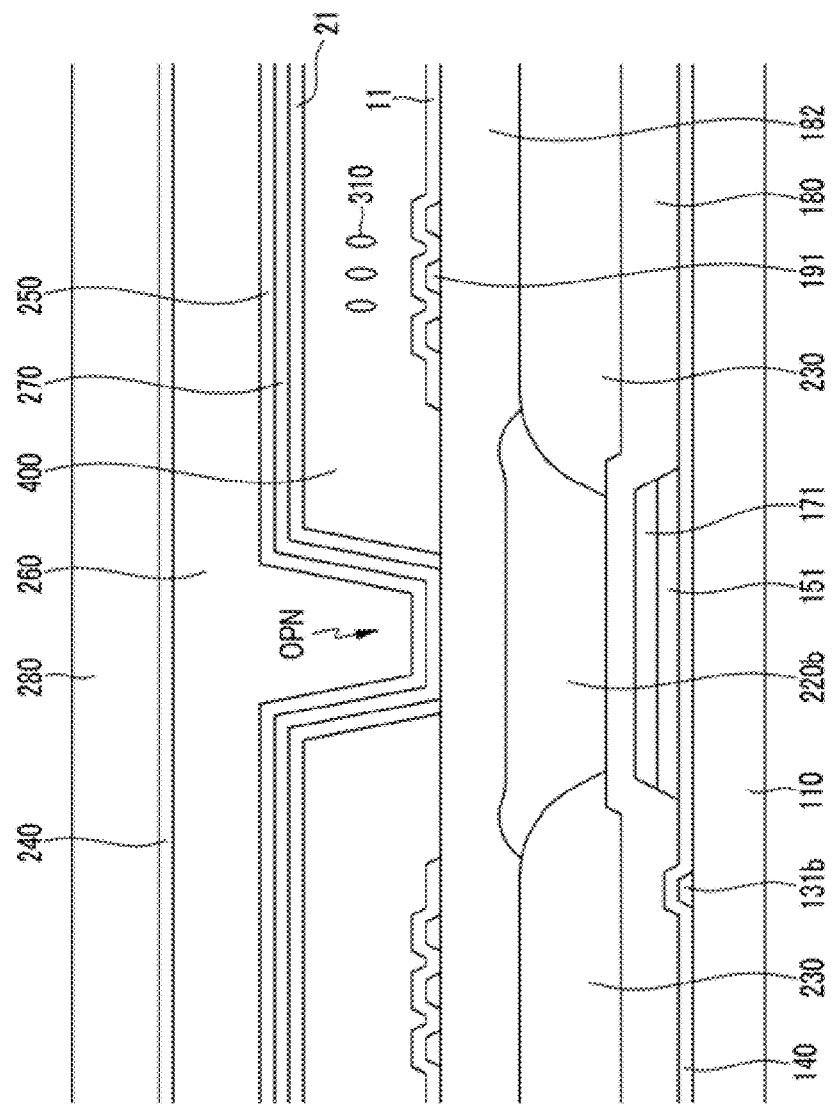
FIG. 2 is a cross-sectional view taken along line II-II of FIG. 1.
Figure 3:
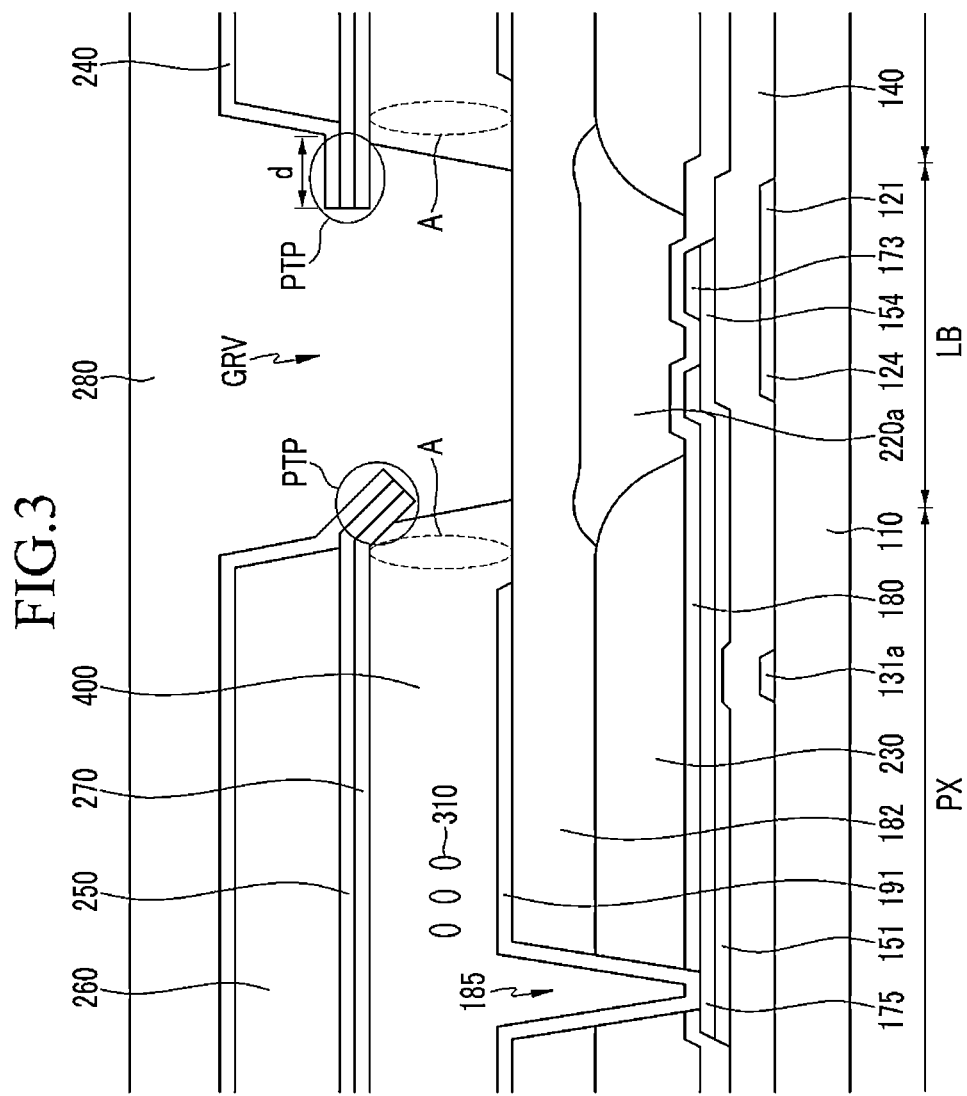
FIG. 3 is a cross-sectional view taken along line III-III of FIG. 1.
Figure 4:
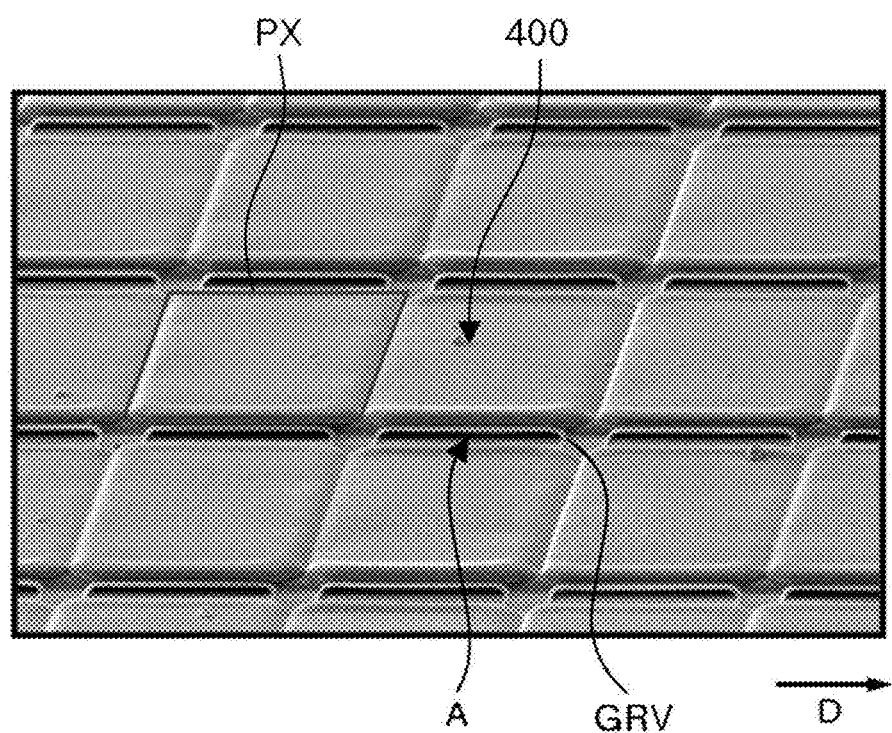
FIG. 4 is a perspective view illustrating an exemplary embodiment of a microcavity according to the invention.

FIG. 1 is a plan view illustrating an exemplary embodiment of a liquid crystal display according to the invention. FIG. 2 is a cross-sectional view taken along line II-II of FIG. 1. FIG. 3 is a cross-sectional view taken along line III-III of FIG. 1. FIG. 4 is a perspective view illustrating an exemplary embodiment of a microcavity according to the invention.

Referring to FIGS. 1 to 3, a gate line 121 and a storage electrode line 131 are disposed on a substrate 110 of transparent glass, plastic, and the like. The gate line 121 transfers a gate signal and is elongated to extend in a horizontal direction, and includes a gate electrode 124 that is a portion protruded from the gate line 121 which extends in the horizontal direction.

The storage electrode line 131 transfers predetermined voltage such as a common voltage Vcom and the like, and includes vertical portions 131b elongated substantially vertical to the gate line 121 and horizontal portions 131a that connect ends of the vertical portions 131b with each other.

A gate insulating film 140 of silicon nitride and the like, is disposed on the gate line 121 and the storage electrode line 131. Semiconductor layers 151 and 154 that may include amorphous, crystalline silicon and the like, are disposed on the gate insulating film 140. The semiconductor layers 151 and 154 may include a semiconductor stripe 151 elongated vertically, and a projection 154 extending toward the gate electrode 124 from the semiconductor stripe 151.

A data line 171, a source electrode 173 connected with the data line 171, and a drain electrode 175 spaced from the source electrode 173 with respect to a thin film transistor channel region are disposed on the semiconductor layers 151 and 154 and the gate insulating film 140. An ohmic contact (not shown) may be disposed between the projection 154 of the semiconductor layer and the source electrode 173 and between the projection 154 of the semiconductor layer and the drain electrode 175. The ohmic contact may include a material such as n+ hydrogenated amorphous silicon doped with silicide or n-type impurities at a high concentration.

The data line 171 transmits a data signal and is elongated to extend in a vertical direction to cross the gate line 121. The data line 171 extends toward the gate electrode 124 and is connected with the source electrode 173 having a U-shape in the plan view. The drain electrode 175 is separated from the data line 171 and is elongated to extend upward in the vertical direction from a center of the U-shape of the source electrode 173.

In the illustrated exemplary embodiment, the drain electrode 175 includes a relatively long and evenly shaped bar portion elongated from the center of the U-shape of the source electrode 173 to a pixel area PX. An end of the drain electrode 175 opposing the source electrode 173 and in the pixel area PX may be relatively wide compared to the bar portion. The term "bar portion" just explains the shape of the drain electrode 175 according to one exemplary embodiment, but the invention is not limited to the bar-shaped drain electrode 175.

The gate electrode 124, the source electrode 173 and the drain electrode 175 form the thin film transistor, together with the projection 154 of the semiconductor layer.

A data wire layer may include the data line 171, the source electrode 173 and the drain electrode 175. The semiconductor layers 151 and 154 may have the same plane shape as that of the data wire layer 171, 173 and 175, and the ohmic contact under the data wire layer 171, 173 and 175 in the plan view, except for the channel region between the source electrode 173 and the drain electrode 175. In one exemplary embodiment, these same plan shapes may be defined when the data wire layer is simultaneously formed with an ohmic contact (not shown) and the semiconductor layer 151 and 154 which is under the data wire layer 171, 173 and 175, such as by using one mask.

In the projection 154 of the semiconductor layer, there is a portion that is exposed (e.g., not covered) by the source electrode 173 and the drain electrode 175, between the spaced apart source electrode 173 and drain electrode 175. A first passivation layer 180 is disposed on the data wire layer 171, 173 and 175 and on the exposed portion of the projection 154 of the semiconductor layer. The first passivation layer 180 includes an inorganic insulator such as silicon nitride, silicon oxide, and the like. However, the first passivation layer 180 may include an organic insulator and an upper surface thereof may be planarized.

Organic films 230 are disposed on the first passivation layer 180. The organic films 230 are disposed in most regions, except for a place in which the thin film transistor, and the like, is disposed. In the exemplary embodiment, the organic films 230 may be elongated to extend along a column direction of a pixel electrode 191, such as being elongated in the vertical direction. The organic film 230 may be a color filter and the color filter may display one of various primary colors such as one of three primary colors of red, green and blue. However, the color filter is not limited to three primary colors of red, green and blue and may also display one of various primary colors including cyan, magenta, yellow and white-based colors.

Adjacent organic films 230 may be spaced apart from each other along the horizontal direction D illustrated in FIG. 1, and along the vertical direction intersecting the horizontal direction D.

FIG. 2 illustrates the adjacent organic films 230 spaced apart from each other along the horizontal direction D and FIG. 3 illustrate the adjacent organic films 230 spaced apart from each other along the vertical direction.

Referring to FIG. 3, a vertical light blocking member 220b is disposed between the organic films 230 that are spaced apart from each other along the horizontal direction D. The vertical light blocking member 220b overlaps edges of each of the adjacent organic films 230, and widths at which the vertical light blocking member 220b overlaps both edges of the organic films 230 is substantially the same. The widths may be taken parallel to the upper surface of the substrate 110 in the cross-sectional view.

Referring to FIG. 4, a horizontal light blocking member 220a is disposed between the organic films 230 that are spaced apart from each other along the vertical direction. The horizontal light blocking member 220a overlaps edges of each of the adjacent organic films 230, and widths at which the horizontal light blocking member 220a overlaps both edges of the organic films 230 is substantially the same.

A collective light blocking member 220 includes the horizontal light blocking member 220a and the vertical light blocking member 220b, and is referred to as a black matrix and prevents light leakage. A light blocking region LB may be an area in which the light blocking member 220 is disposed. A planarizing film 182 may be disposed on the light blocking member 220 and the organic film 230. The planarizing film 182 may include an organic material and may serve to planarize the layers and films of the liquid crystal display disposed thereunder.

The pixel electrode 191 is disposed on the planarizing film 182. The pixel electrode 191 is electrically connected to the drain electrode 175 that is one terminal of the thin film transistor, through a contact hole 185.

The pixel electrode 191 may be considered a fine slit electrode and an overall shape of the fine slit electrode is a quadrangle. The pixel electrode 191 includes a cross-shape stem portion that is configured of a horizontal stem portion 191a, and a vertical stem portion 191b intersecting the horizontal stem portion 191a. Further, the pixel electrode 191 includes four sub-regions defined by the horizontal stem portion 191a and the vertical stem portion 191b, and each sub-region includes a plurality of fine branch portions 191c.

First fine branch portions 191c of the fine slit pixel electrode 191 obliquely extend upward towards the left from the horizontal stem portion 191a or the vertical stem portion 191b and second fine branch portions 191c obliquely extend upward towards the right from the horizontal stem portion 191a or the vertical stem portion 191b. Further, third fine branch portions 191c extend downward towards the left from the horizontal stem portion 191a or the vertical stem portion 191b and fourth fine branch portions 191c obliquely extend downward towards the right from the horizontal stem portion 191a or the vertical stem portion 191b. The fine branch portions 191c of two adjacent sub-regions may be orthogonal to each other.

The fine branch portions 191c are elongated in an extension direction, and a width of a fine branch portion 191c is taken perpendicular to the extension direction. In the illustrated exemplary embodiment, widths of the fine branch portions 191c are substantially uniform. Although not illustrated, a width of the fine branch portion 191c may gradually increase and/or decrease along the extension direction.

The bar portion of the drain electrode 175 as described above is elongated along the vertical stem portion 191b of the pixel electrode 191, such as being parallel thereto, but not limited thereby.

In the illustrated exemplary embodiment, a contact hole 185 is defined penetrating through the first passivation layer 180, the organic film 230 and the planarizing film 182, and the drain electrode 175 is connected with the pixel electrode 191 through the contact hole 185. In the exemplary embodiment, the contact hole 185 may be defined at an intersecting point at which the horizontal stem portion 191a and the vertical stem portion 191b of the pixel electrode 191 intersect each other. As illustrated in FIG. 1, a wide end of the drain electrode 175 overlaps the intersecting point of the horizontal stem portion 191a and the vertical stem portion 191b, and overlaps the contact hole 185.

In the adjacent sub-regions, directions in which liquid crystal molecules are inclined are different from each other. The horizontal stem portion 191a and the vertical stem portion 191b are a boundary region at which the adjacent sub-regions meet each other. The boundary region corresponds to a non-transmitting portion of the liquid crystal display at which the directions in which the liquid crystal molecules are inclined are not determined and light does not transmit therethrough. Therefore, according to the illustrated exemplary embodiment of the invention, even though the drain electrode 175 and the contact hole 185 are disposed in a pixel area PX, a reduction in an aperture ratio may be minimized.

A microcavity 400 is defined on the pixel electrode 191. A liquid crystal material including a liquid crystal molecule 310 is disposed such as by injection into the microcavity 400. The microcavity 400 has a liquid crystal injection hole A through which the liquid crystal material may be introduced to the microcavity 400. The microcavity 400 may be elongated along a column direction of the pixel electrode 191, that is, the vertical direction.

A lower alignment film 11 may be disposed on (e.g., above) the pixel electrode 191 and an upper alignment film 21 may be disposed on (e.g., above) the microcavity 400. That is, the lower alignment film 11 may be between the pixel electrode 191 and the microcavity 400, and the upper alignment film 21 may be between the common electrode 270 and the microcavity 400, as illustrated in FIG. 2. The microcavity 400 may be bounded by the lower and upper alignment films 11 and 21, but the invention is not limited thereto or thereby. Alternatively, the lower and/or upper alignment layers 11 and 21 may be omitted.

In the exemplary embodiment, an alignment material of the alignment film and the liquid crystal material including the liquid crystal molecule 310 may be disposed in the microcavity 400 such as by using a capillary force. Both materials may be introduced to the microcavity 400 through the liquid crystal injection hole A.

A common electrode 270 and an upper insulating layer 250 are disposed on the microcavity 400. The common electrode 270 is applied with the common voltage Vcom and generates an electric field together with the pixel electrode 191 to which data voltage is applied, thereby determining the directions in which the liquid crystal molecules 310 disposed in the microcavity 400 between the two electrodes are inclined. The common electrode 270 forms a capacitor together with the pixel electrode 191 and maintains the applied voltage even after the thin film transistor is turned off. The upper insulating layer 250 may include silicon nitride (SiNx) or silicon oxide ($SiO_2$).

A supporting member 260 is disposed on the upper insulating layer 250. The supporting member 260 may include silicon oxycarbide (SiOC), photo resist or other organic materials. In exemplary embodiments, when the supporting member 260 includes the silicon oxycarbide (SiOC), the support member 260 may be formed by a chemical vapor deposition method and when the supporting member 260 includes the photo resist, the supporting member 260 may be formed by a coating method. The silicon oxycarbide (SiOC) may have a relatively high transmittance and a relatively small film stress by the chemical vapor deposition method so as not to be deformed. Therefore, in the exemplary embodiment, the supporting member 260 includes the silicon oxycarbide (SiOC) and may be a relatively stable film through which light is transmitted well.

A groove GRV that penetrates through the microcavity 400, the upper alignment film 21, the common electrode 270, the upper insulating layer 250 and the support member 260 is defined overlapping the horizontal light blocking member 220a.

A lower insulating layer 240 is disposed on the supporting member 260. The lower insulating layer 240 may include silicon nitride (SiNx) or silicon oxide (SiO2).

In the exemplary embodiment, a projection PTP is at a distal end of the common electrode 270 in the edge portion of the pixel area PX. In an exemplary embodiment of manufacturing the liquid crystal display, when the upper insulating layer 250 and the lower insulating layer 240 are formed using the same mask as the common electrode 270, distal ends of the upper insulating layer 250 and the lower insulating layer 240 may form the projection PTP together with the distal end of the common electrode 270. Ends of the upper insulating layer 250, the lower insulating layer 240 and the common electrode 270 may be coplanar with each other. As illustrated in FIG. 3, the projection PTP in the edge portion of the pixel area PX is protruded to the region in which the groove GRV is disposed and has a bent shape at the distal end of the common electrode 270 which is disposed in the pixel area PX.

In the exemplary embodiment, a length of the projection PTP such as in a cross-sectional direction is preferably smaller than a cell gap of the liquid crystal layer disposed in the microcavity 400. The cell gap may be a distance taken perpendicular to the substrate 110, such as taken between the planarizing film 182 and an upper surface of the microcavity 400 in the illustrated exemplary embodiment. The projection PTP may be inclined towards the substrate 110 at a cross-sectional distance which is less than a thickness of the liquid crystal layer.

Further, in the exemplary embodiment, as illustrated in FIG. 3, since the pixel electrode 191 is disposed only in the pixel area PX and is not disposed in the light blocking region (LB), an electrical short defect between the common electrode 270 and the pixel electrode 191 may be reduce or effectively prevented even when the projection PTP at the distal end of the common electrode 270 is protruded downward toward the pixel electrode 191.

A capping layer 280 is disposed on the lower insulating layer 240. The capping layer 280 contacts an upper surface and a side wall of the lower insulating layer 240, and the capping layer 280 covers liquid crystal injection holes A of the microcavity 400 exposed by the groove GRV. The capping layer 280 may include thermosetting resin, the silicon carbide (SiOC), or graphene.

When the capping layer 280 includes graphene, the capping layer 280 has a strong impermeability against gas including helium, and the like, and therefore may serve as a barrier to the liquid crystal injection holes A. Since the graphene is a material formed of carbon bonds, the capping layer 280 including the graphene reduces or effectively prevents contamination of the liquid crystal material in the microcavity 400 even when the capping layer contacts the liquid crystal material in the microcavity 400. In addition, the graphene may serve to protect the liquid crystal material from external oxygen and moisture.

In the exemplary embodiment, the liquid crystal material may be introduced into the microcavity through the liquid crystal injection holes A of the microcavity 400, such that the liquid crystal display may omit a separate upper substrate.

Hereinafter, the microcavity 400 will be described in detail with reference to FIGS. 1 to 4.

Referring to FIGS. 1 to 4, a plurality of grooves GRV divides a plurality of microcavities 400 into rows of microcavities 400, respectively. The rows of microcavities 400 overlap the gate line 121 and are elongated in the horizontal direction D in which the gate line 121 extends. Each of the plurality of microcavities 400 may correspond to a pixel area PX, and groups (e.g., columns) of microcavities 400 are elongated in the column direction.

A groove GRV disposed between the microcavities 400 may be elongated along the horizontal direction D in which the gate line 121 extends, and the liquid crystal injection hole A of the microcavity 400 essentially forms a region corresponding to a boundary portion between the groove GRV and the microcavity 400. The liquid crystal injection hole A is elongated along a same direction in which the groove GRV extends. Further, an open portion OPN disposed between the microcavities 400 adjacent to each other in the horizontal direction D in which the gate line 121a extends may be filled with the supporting member 260 as illustrated in FIG. 2.

The illustrated exemplary embodiment shows the groove GRV is elongated along the horizontal direction D in which the gate line 121a extends, but according to an alternative exemplary embodiment, a plurality of grooves GRV may be disposed elongated along the column direction in which the data line 171 extends, and a group of microcavities 400 may be elongated in the row direction. In the alternative exemplary embodiment, the liquid crystal injection hole A may be elongated along the same direction in which the groove GRV is extends, that is, along the direction in which the data line 171 extends.

Figure 5:
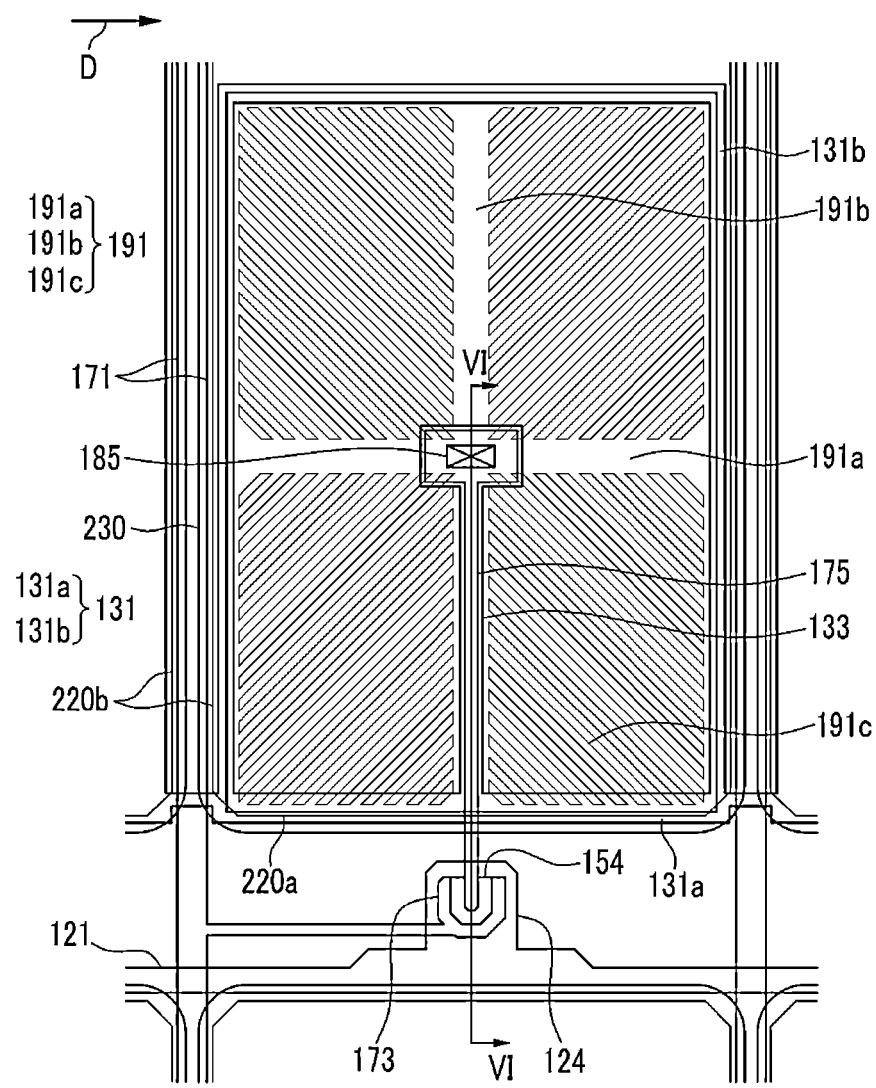
FIG. 5 is a plan view illustrating another exemplary embodiment of a liquid crystal display according to the invention.
Figure 6:
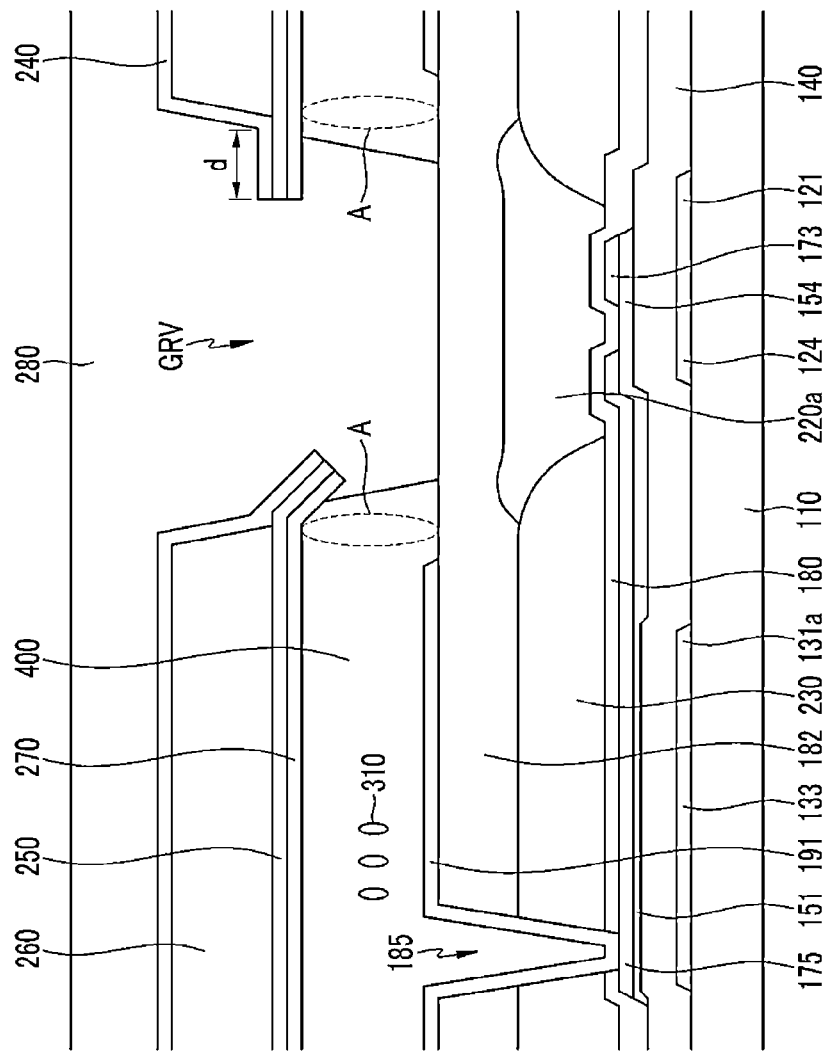
FIG. 6 is a cross-sectional view taken along line VI-VI of FIG. 5.

FIG. 5 is a plan view illustrating another exemplary embodiment of a liquid crystal display according to the invention. FIG. 6 is a cross-sectional view taken along line VI-VI of FIG. 5.

Exemplary embodiments to be described with reference to FIGS. 5 and 6 have substantially the same configuration as the exemplary embodiments described with reference to FIGS. 1 to 4 and therefore, only different configurations therebetween will be described below.

Referring to FIGS. 5 and 6, a light blocking pattern 133 is further disposed, in addition to components of the exemplary embodiments described in FIGS. 1 to 4. In the illustrated exemplary embodiment, the light blocking pattern 133 continuously extends from the horizontal portion 131a of the storage electrode line 131 and then, is elongated along the bar portion of the drain electrode 175

The light blocking pattern 133 is disposed in and/or on the same layer as the gate line 121 and serves to block light from a rear or back of the liquid crystal display which may be otherwise incident on the semiconductor stripe layer 151 disposed under the drain electrode 175.

Figure 7:
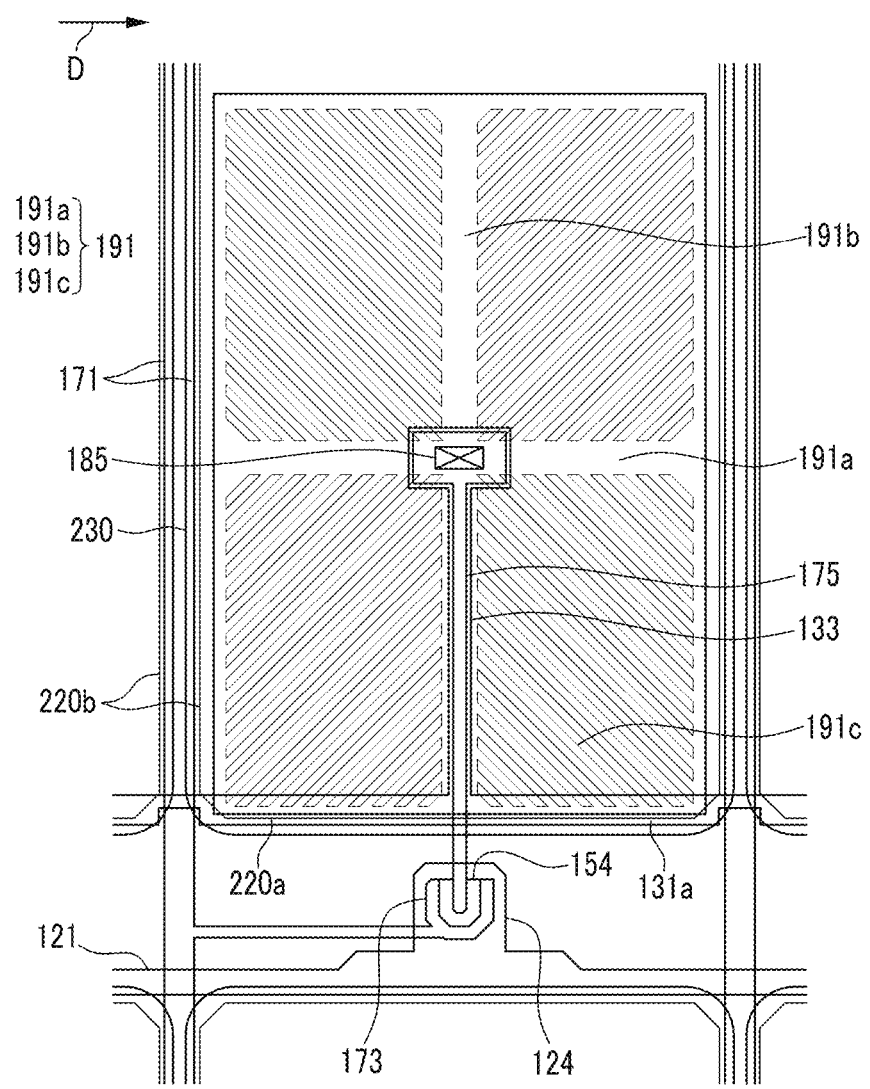
FIG. 7 is a plan view illustrating still another exemplary embodiment of a liquid crystal display according to the invention.

FIG. 7 is a plan view illustrating still another exemplary embodiment of a liquid crystal display according to the invention.

An exemplary embodiment to be described with reference to FIG. 7 has substantially the same configuration as the exemplary embodiments described with reference to FIGS. 5 and 6 and therefore, only different configurations therebetween will be described below.

Like the exemplary embodiments described in FIGS. 5 and 6, in the illustrated exemplary embodiment of FIG. 7, the liquid crystal display includes the light blocking pattern 133 elongated along the bar portion of the drain electrode 175. The light blocking pattern 133 is continuously extended from the horizontal part 131a of the storage electrode line 131 and may be applied with predetermined voltage like common voltage Vcom as a storage electrode. Therefore, the light blocking pattern 133 forms a storage capacitor together with the pixel electrode 191, in particular, the vertical stem portion 191b of the pixel electrode. This storage capacitor forms additional capacitance to reduce the effect of the parasitic capacitance of the pixel electrode 191. As a result, the light blocking pattern 133 may sufficiently form the additional capacitance such that the vertical portions 131b of the storage electrode line 131 disposed at the left and right of the pixel electrode 191 may be omitted.

The illustrated exemplary embodiment shown in FIG. 7 does not include the vertical portions 131b of the storage electrode line 131 which are shown with reference to FIGS. 5 and 6. The resulting structure which omits the vertical portions 131b of the storage electrode line 131 includes the pixel electrode 191 closer to the data line 171 in consideration of omitting the space required for the vertical portions 131b. Therefore, it is possible to increase the aperture ratio of the liquid crystal display by reducing the distance between the pixel electrode 191 and the data line 171 that are further spaced from each other in the related art due to vertical crosstalk.

FIGS. 8 to 12 are cross-sectional views illustrating an exemplary embodiment of a manufacturing method of a liquid crystal display according to the invention FIGS. 8 to 12 sequentially illustrate cross-sectional views taken along line III-III of FIG. 1 so as to show the exemplary embodiment of the manufacturing method of the liquid crystal display according to the invention.

Figure 8:
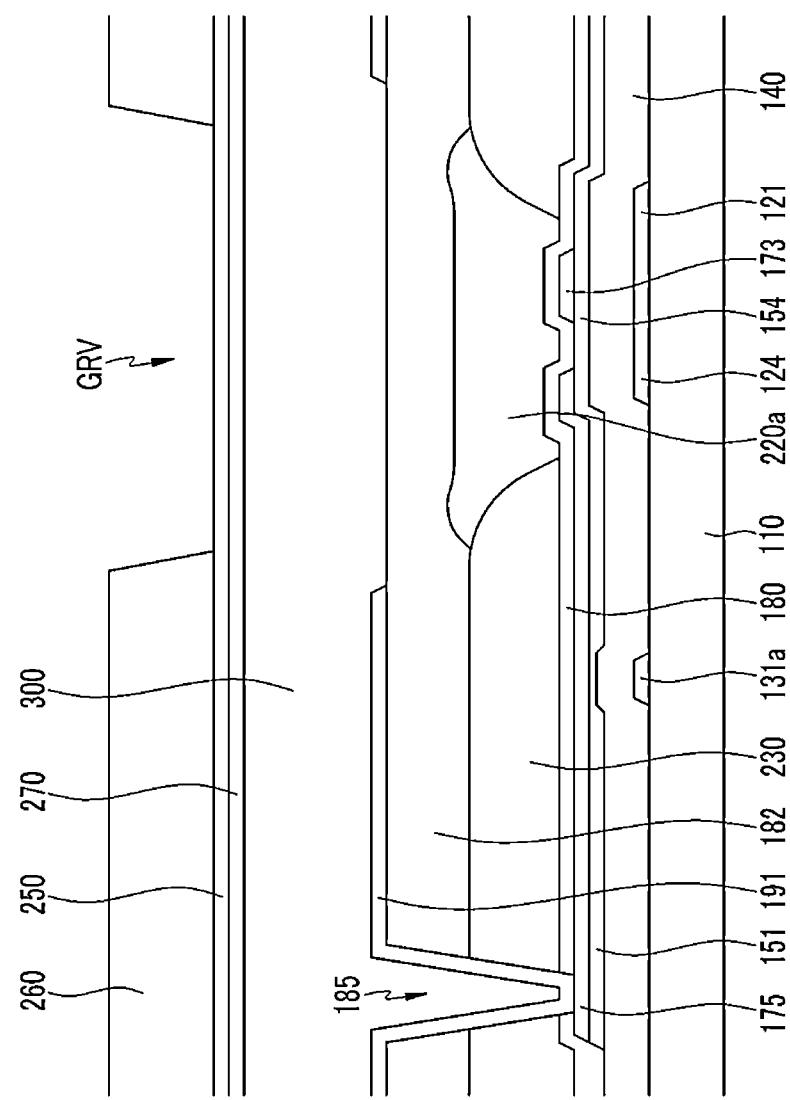
FIGS. 8 to 12 are cross-sectional views illustrating an exemplary embodiment of a manufacturing method of a liquid crystal display according to the invention

Referring to FIG. 8, the gate line 121 including the gate electrode 124, and the storage electrode line 131 are formed (e.g., provided) on the substrate 110 which includes transparent glass or plastic. FIG. 8 illustrates only the horizontal portion 131a of the storage electrode line 131, but the vertical portion 131b of the storage electrode line 131 is also formed referring again to FIG. 1.

The gate insulating film 140 is formed on the gate line 121 and the horizontal and vertical portions 131a and 131b. The data wire layers 171, 173 and 175, the semiconductor layers 151 and 154 and the ohmic contact (not illustrated) are formed on the gate insulating film 140. The first passivation film 180 is formed to cover the data wire layer 171, 173 and 175 and the projection 154 of the semiconductor layer exposed between the source electrode 173 and the drain electrode 175.

In an exemplary embodiment, the semiconductor layers 151 and 154 and the data wire layer 171, 173 and 175 may be formed using the same mask such that the semiconductor layers 151 and 154 may have substantially the same plane shape as the data wire layer 171, 173, and 175 and the ohmic contact thereunder, except for the channel region between the source electrode 173 and the drain electrode 175.

The organic film 230 is formed on the first passivation film 180 to correspond to the pixel area. The light blocking member 220 including the horizontal light blocking member 220a and the vertical light blocking member 220b is formed between the adjacent organic films 230. FIG. 8 illustrates only the horizontal light blocking member 220a, but referring again to FIG. 1, the vertical light blocking member 220b is also formed.

The planarizing film 182 is formed on the organic film 230 and on the light blocking member 220. The planarizing film 182 may include an organic material and may serve to planarize the other layers and films of the liquid crystal display formed thereunder.

The contact hole 185 is formed to expose the drain electrode 175, such as by patterning the planarizing film 182, the organic film 230 and the first passivation layer 180. The contact hole 185 is formed in the pixel area PX.

The pixel electrode 191 having a fine slit structure is formed on the planarizing film 182. The shape of the pixel electrode 191 is illustrated in FIG. 1, but is not limited thereto or thereby. The pixel electrode 191 is physically and/or electrically connected to the drain electrode 175 through the contact hole 185.

A sacrificial layer 300 including the silicon oxycarbide (SiOC) or the photo resist is formed on the pixel electrode 191. The sacrificial layer 300 may be formed of an organic material, except for the silicon oxycarbide (SiOC) or the photo resist.

The common electrode 270, the upper insulating layer 250 and the supporting member 260 are sequentially formed on the sacrificial layer 300. The common electrode 270 may be formed of a transparent conductor such as ITO, IZO and the like, and the upper insulating layer 250 may be formed of silicon nitride (SiNX) or silicon oxide (SiO2). The support member 260 in the illustrated exemplary embodiment may be formed of a material different from the sacrificial layer 300.

The groove GRV exposing the upper insulating layer 250 corresponding to the light blocking member 220a is formed by patterning the supporting member 260.

Figure 9:
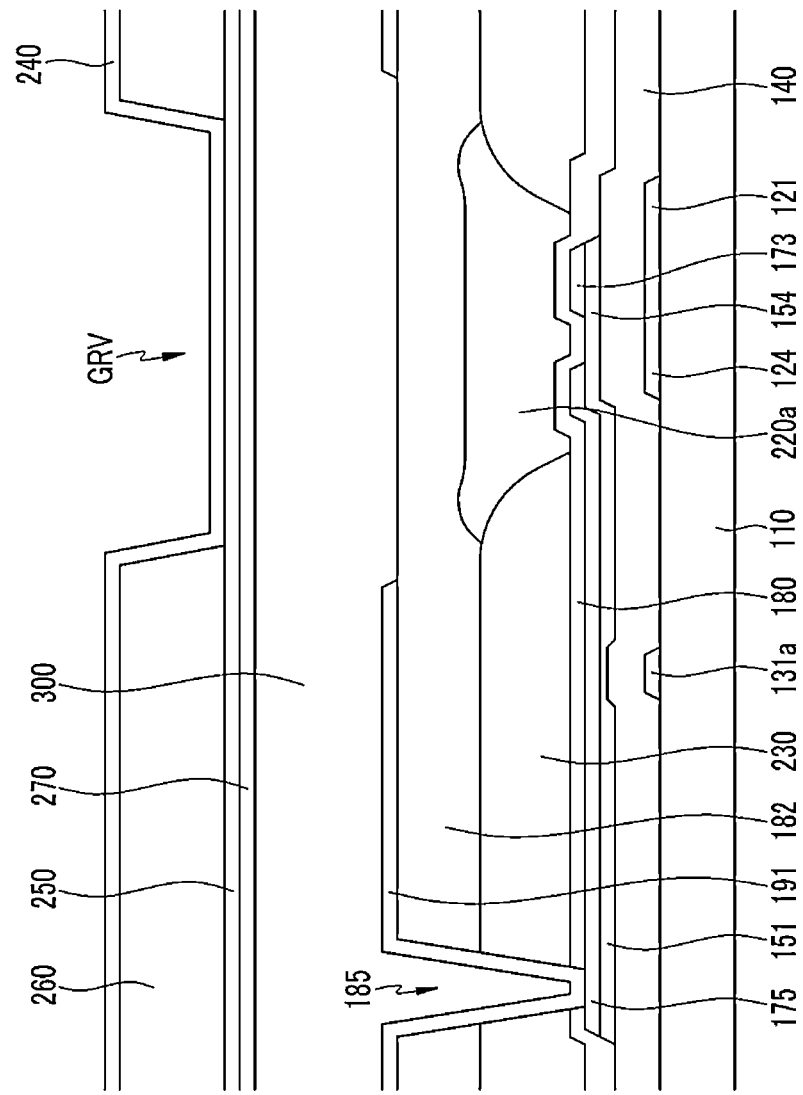

Referring to FIG. 9, the lower insulating layer 240 is formed to cover the exposed upper insulating layer 250 and the supporting member 260. The lower insulating layer 240 may be formed of silicon nitride (SiNx) or silicon oxide (SiO2). In an exemplary embodiment, the upper insulating layer 250 between the supporting member 260 and the common electrode 270, and the lower insulating layer 240 between the supporting member 260 and the capping layer 280, may collectively be referred to as an overcoat layer.

Figure 10:
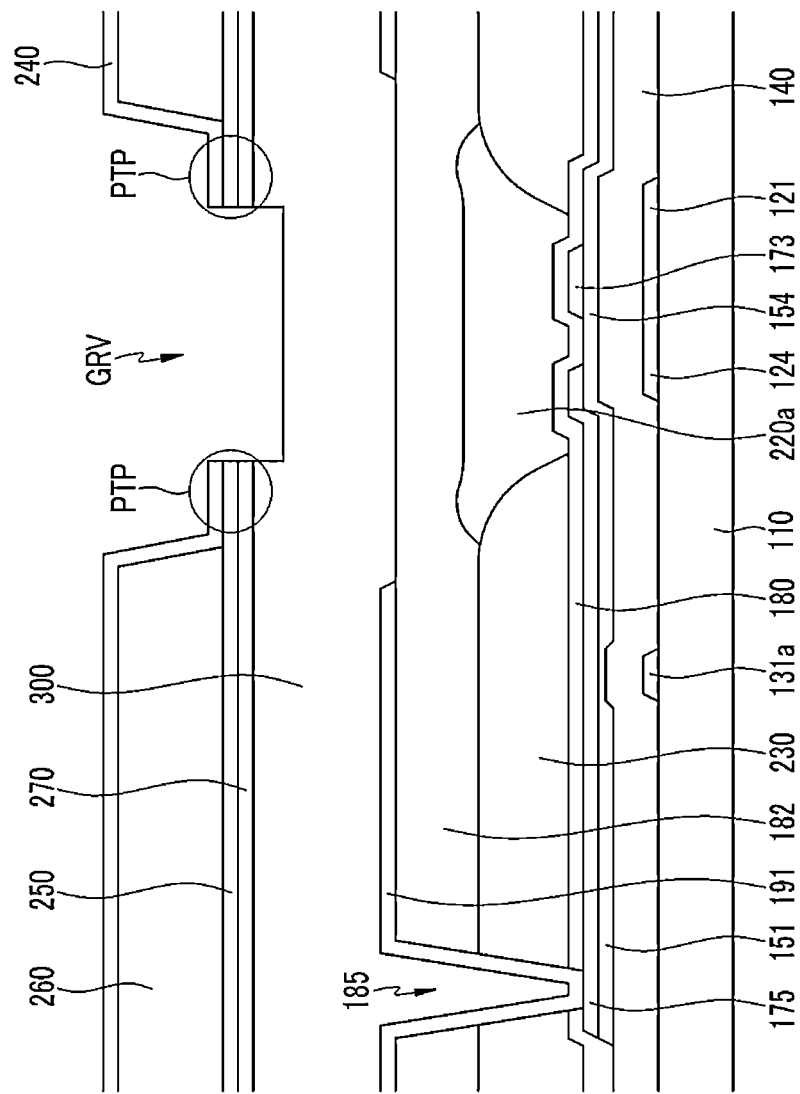

Referring to FIG. 10, the sacrificial layer 300 is exposed by sequentially patterning the lower insulating layer 240, the upper insulating layer 250 and the common electrode 270 disposed at the portion corresponding to the groove GRV. In the patterning the lower insulating layer 240, the upper insulating layer 250 and the common electrode 270, a portion of the sacrificial layer 300 corresponding to the groove GRV may be partially removed. The mis-alignment occurs during the patterning the lower insulating layer 240, the upper insulating layer 250 and the common electrode 270, such that the projection PTP in which the end of the common electrode 270 is protruded may be formed.

The upper insulating layer 250 and the lower insulating layer 240 formed on the common electrode 270 may form the projection PTP together with the common electrode 270.

Figure 11:
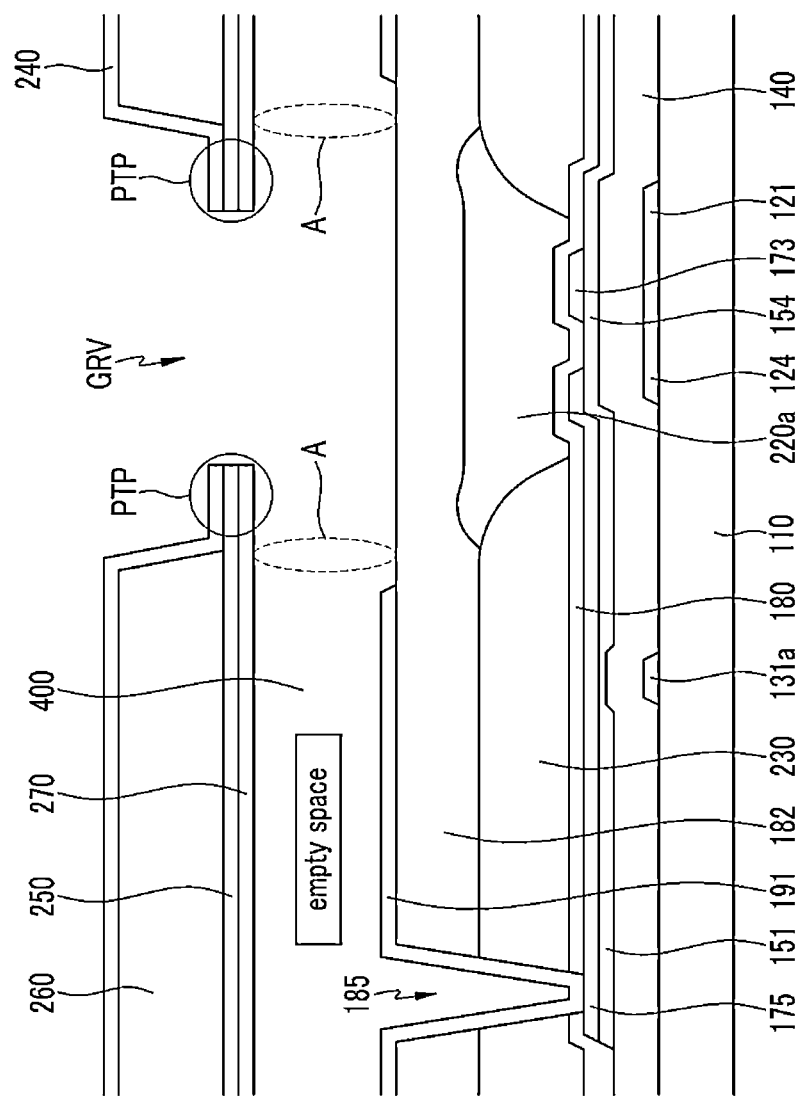

Referring to FIG. 11, the sacrificial layer 300 is removed through the groove GRV by an oxygen (O2) ashing processing, a wet etching method, and the like. By removing the sacrificial layer 300, the microcavity 400 having the liquid crystal injection hole A is formed. The microcavity 400 is an empty space state due to the removal of the sacrificial layer 300. The liquid crystal injection hole A may be formed to be elongated along a direction parallel with a signal line connected with the terminal of the thin film transistor.

Figure 12:
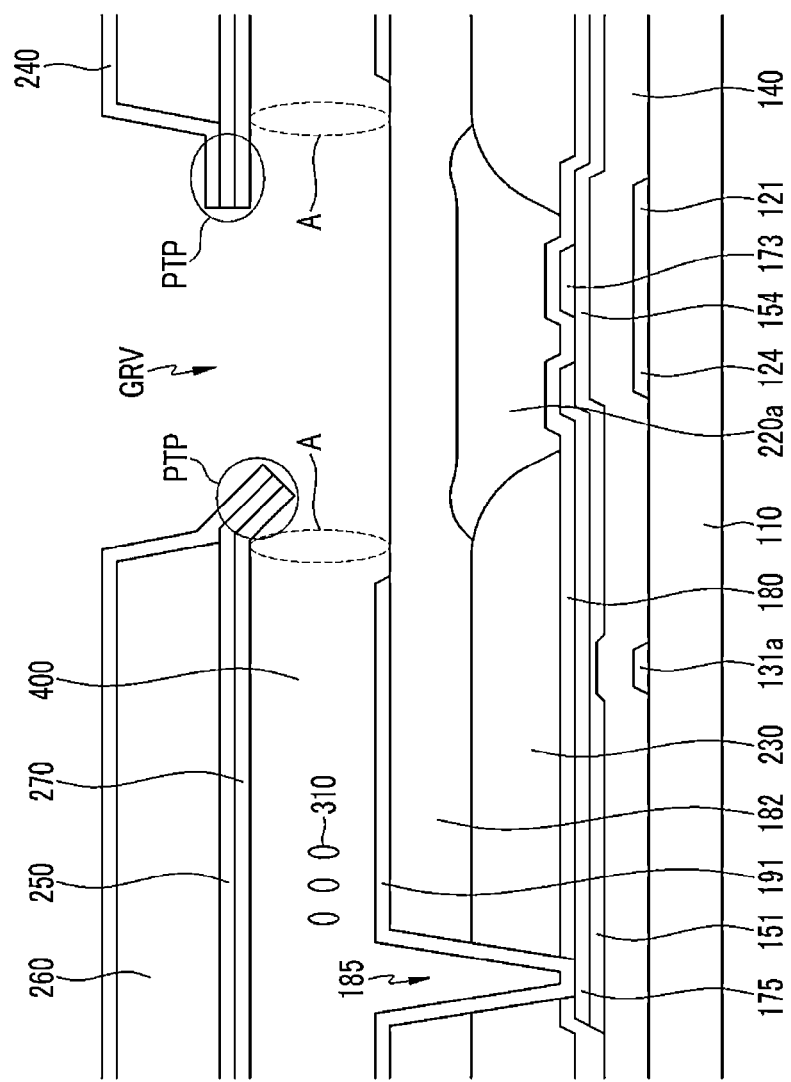

Referring to FIG. 12, an alignment material may be introduced to the microcavity 400 through the liquid crystal injection hole A illustrated in FIG. 11 to form the alignment film (not illustrated) contacting the pixel electrode 191 and the common electrode 270 at upper and lower sides of the microcavity 400. However, the liquid crystal display may omit the alignment film.

The liquid crystal material including the liquid crystal molecule 310 is introduced into the microcavity 400 through the liquid crystal injection hole A. If an alignment film has been previously formed in the microcavity 400, the liquid crystal material may contact the alignment film. If an alignment film has not been previously formed in the microcavity 400, the liquid crystal material may contact the pixel electrode 191 and the common electrode 270.

The alignment material may include a solid content and a solvent, and after the alignment material is introduced in to the microcavity 400, a bake process is performed. By the bake process, stress is applied such that the projection PTP including a distal end of the common electrode 270 that is not otherwise supported may sag. That is, the distal end portions of the lower insulating layer 240, the upper insulating layer 250 and the common electrode 270 which were once substantially parallel with the substrate 110, may bend towards the substrate 110. In addition to this, since the microcavity 400 and the groove GRV are in an empty space at this stage even in the physical viewpoint, the projection PTP is subjected to a gravity force and therefore may sag. Further, before the alignment material and the liquid crystal material is introduced into the microcavity 400, a cleaning process may be performed and the projection PTP may sag due to the cleaning solution used in the cleaning process.

Figure 13:
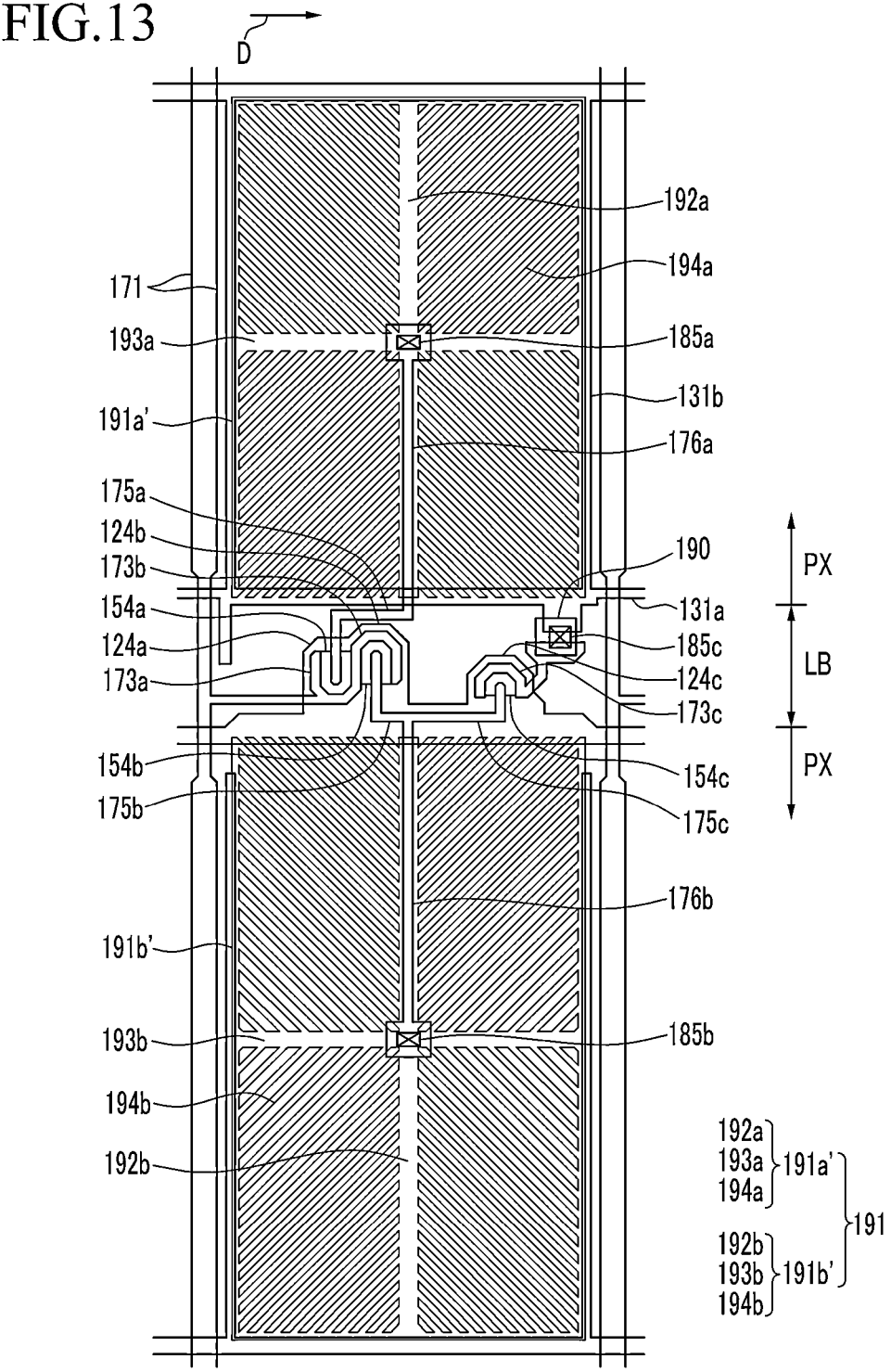
FIG. 13 is a plan view illustrating yet another exemplary embodiment of a liquid crystal display according to the invention.

FIG. 13 is a plan view illustrating yet another exemplary embodiment of a liquid crystal display according to the invention.

The exemplary embodiment to be described with reference to FIG. 13 has substantially the same configurations as the exemplary embodiments described in FIGS. 1 to 4, but has a difference in the thin film transistor structure therebetween.

Referring to FIG. 13, three thin film transistors are formed in one pixel, differently from the exemplary embodiments described with reference to FIGS. 1 to 4. In detail, a first gate electrode 124a, a first source electrode 173a, and a first drain electrode 175a form a first thin film transistor together with a first semiconductor layer 154a, and a channel of the first thin film transistor is formed by a portion of the semiconductor layer 154a between the first source electrode 173a and the first drain electrode 175a. Similarly thereto, a second gate electrode 124b, a second source electrode 173b, and a second drain electrode 175b form a second thin film transistor together with a second semiconductor layer 154b, and a channel of the second thin film transistor is formed by a portion of the second semiconductor layer 154b between the second source electrode 173b and the second drain electrode 175b. A third gate electrode 124c, a third source electrode 173c, and a third drain electrode 175c form a third thin film transistor together with a third semiconductor layer 154c, and a channel of the third thin film transistor is formed by a portion of the third semiconductor layer 154c between the third source electrode 173c and the third drain electrode 175c.

In the exemplary embodiment, the first drain electrode 175a is connected to a first subpixel electrode 191a' through a first contact hole 185a, and the second drain electrode 175b is connected with a second subpixel electrode 191b' through a second contact hole 185b. The first drain electrode 175a and the second drain electrode 175b include a first extension 176a and a second extension 176b that are elongated to extend to the pixel areas PX of the one pixel, respectively. Wide ends of the first extension 176a and the second extension 176b are respectively electrically connected to the first subpixel electrode 191a' and the second subpixel electrode 191b' by the first contact hole 185a and the second contact hole 185b that are formed within the pixel areas PX.

In the exemplary embodiment, a third contact hole 185c connects the horizontal portion 131a of the storage electrode line 131 with the third source electrode 173c. In the exemplary embodiment, the third contact hole 185c is defined to penetrate through an insulating film disposed between a level (e.g., layer) at which the pixel electrode 191 is disposed and a level (e.g., layer) at which the storage electrode line 131 is disposed.

The first subpixel electrode 191a' may be considered a fine slit electrode and an overall shape of the fine slit electrode is a quadrangle. The first subpixel electrode 191a' includes a cross-shape stem portion that is configured of a horizontal stem portion 193a, and a vertical stem portion 192a intersecting the horizontal stem portion 193a. Further, the first subpixel electrode 191a' includes four sub-regions defined by the horizontal stem portion 193a and the vertical stem portion 192a, and each sub-region includes a plurality of fine branch portions 194a. Similarly, the second subpixel electrode 191b' may be considered a fine slit electrode and an overall shape of the fine slit electrode is a quadrangle. The second subpixel electrode 191b' includes a cross-shape stem portion that is configured of a horizontal stem portion 193b, and a vertical stem portion 192b intersecting the horizontal stem portion 193b. Further, the second subpixel electrode 191b' includes four sub-regions defined by the horizontal stem portion 193b and the vertical stem portion 192b, and each sub-region includes a plurality of fine branch portions 194b.

A separate ohmic contact 190 is in and/or on a same layer as the pixel electrode 191. A portion of the horizontal portion 131a of the storage electrode line 131 and a portion of the third source electrode 173c are exposed by the third contact hole 185c. The ohmic contact 190 fills the third contact hole 185c, such that the horizontal portion 131a of the storage electrode line 131 and the third source electrode 173c are electrically connected with each other. Therefore, unlike the first contact hole 185a and the second contact hole 185b, the third contact hole 185c which is filled with the ohmic contact 190 is disposed in the light blocking region LB rather than in the pixel area PX, to reduce the occurrence of an electrical short which may be caused by the projection PTP including the common electrode. If the third contact hole 185c were disposed within the pixel area PX similarly to the first contact hole 185a and the second contact hole 185b, the aperture ratio may be undesirably reduced. However, in the illustrated exemplary embodiment, the position of the third contact hole 185c is disposed at substantially a center of the light blocking region LB, such that the possibility of an electrical short defect may be relatively reduced.

Figure 14:
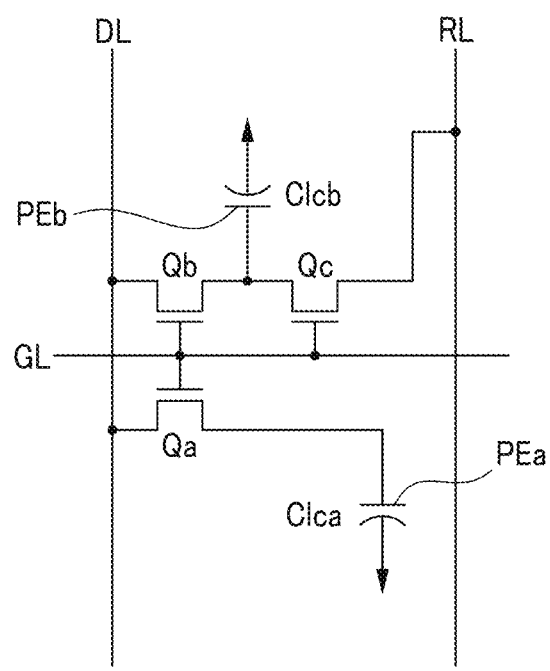
FIG. 14 is an equivalent circuit diagram of an exemplary embodiment of one pixel in the liquid crystal display of FIG. 13.

FIG. 14 is an equivalent circuit diagram of one pixel in the liquid crystal display according to the exemplary embodiment of FIG. 13. The structure and operation of the circuit diagram of the liquid crystal display illustrated in FIG. 13 will be described with reference to FIG. 14.

An exemplary embodiment of the signal line, the disposition of the pixel, and one example of the driving method of the liquid crystal display according to the invention will be described with reference to FIG. 14.

Referring to FIG. 14, an exemplary embodiment of one pixel of the liquid crystal display according to the invention includes a plurality of signal lines including a gate line GL transferring a gate signal, a data line DL transferring a data signal and a reference voltage line RL transferring a divided reference voltage, a first switching element Qa connected to the plurality of signal lines, a second switching element Qb, a third switching element Qc, a first liquid crystal capacitor Clca and a second liquid crystal capacitor Clcb. According to the exemplary embodiment of FIGS. 1 to 5 as described above, the reference voltage line RL is formed of the horizontal and vertical portions 131a and 131b of the storage electrode line. According to an alternative exemplary embodiment, the reference voltage line RL for transferring the divided reference voltage may be separate from the storage electrode line 131.

The first switching element Qa and the second switching element Qb are each connected with the gate line GL and the data line DL, and the third switching element Qc is connected with an output terminal of the second switching element Qb and the reference voltage line RL.

The first switching element Qa and the second switching element Qb are each a three terminal element such as a thin film transistor, and the like. The control terminal thereof is connected with the gate line GL and the input terminal thereof is connected with the data line DL. The output terminal of the first switching element Qa is connected with the first liquid crystal capacitor Clca, and the output terminal of the second switching element Qb is connected with the second liquid crystal capacitor Clcb and the output terminal of the third switching element Qc.

The third switching element Qc also is a three terminal element such as the thin film transistor, and the like, and the control terminal is connected with the gate line GL, the output terminal is connected with the second liquid crystal capacitor Clcb, and the input terminal is connected with the reference voltage line RL.

When a gate on Von signal is applied to the gate line GL, the first switching element Qa, the second switching element Qb and the third switching element Qc that are connected therewith are turned on. Therefore, the data voltage applied to the data line DL is applied to a first electrode PEa and a second electrode PEb, respectively, through the first switching element Qa and the second switching element Qb that are turned on. The data voltage applied to the first electrode PEa and the second electrode PEb may be charged with the same value. However, according to the exemplary embodiment of the invention, the voltage applied to the second electrode PEb is divided through the third switching element Qc that is connected with the second switching element Qb in series. Therefore, the voltage applied to the second electrode PEb is much smaller than the voltage applied to the first electrode PEa.

Figure 15:
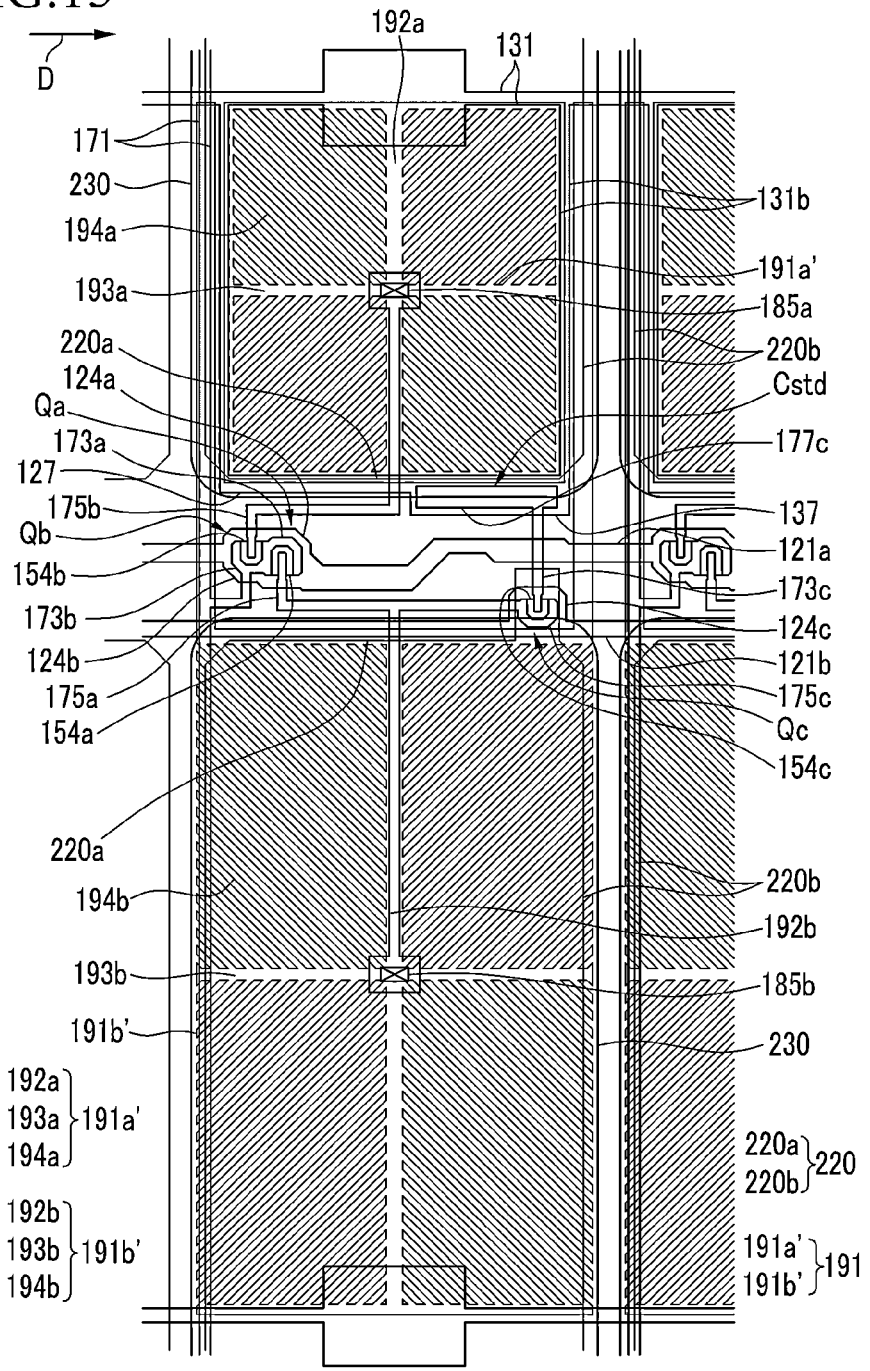
FIG. 15 is a plan view illustrating yet another exemplary embodiment of a liquid crystal display according to the invention.

FIG. 15 is a plan view illustrating yet another exemplary embodiment of a liquid crystal display according to the invention.

An exemplary embodiment to be described with reference to FIG. 15 has substantially the same configuration as the exemplary embodiments described in FIGS. 1 to 4 like the exemplary embodiments described in FIGS. 13 and 14, but has a difference in the thin film transistor structure therebetween.

Referring to FIG. 15, three thin film transistors are disposed in one pixel, differently from the exemplary embodiments described with reference to FIGS. 1 to 4. In detail, the first gate electrode 124a, the first source electrode 173a and the first drain electrode 175a forms a first thin film transistor Qa together with the first semiconductor layer 154a. The second gate electrode 124b, the second source electrode 173b and the second drain electrode 175b forms a second thin film transistor Qb together with the second semiconductor layer 154b. The third gate electrode 124c, the third source electrode 173c and the third drain electrode 175c forms a third thin film transistor Qc together with the third semiconductor layer 154c.

Differently from the foregoing exemplary embodiments, a decompression gate line 121b is disposed in and/or on a same layer as a gate line 121a. Further, a wide end portion 177c of the third source electrode 173c overlaps a capacitive electrode 137 to form a decompression capacitor Cstd.

In the exemplary embodiment, the first contact hole 185a and the second contact hole 185b are disposed in respective pixel areas PX. Unlike the exemplary embodiment described in FIGS. 13 and 14, the third contact hole is omitted in FIG. 15, such that the aperture ratio or not reduced.

Figure 16:
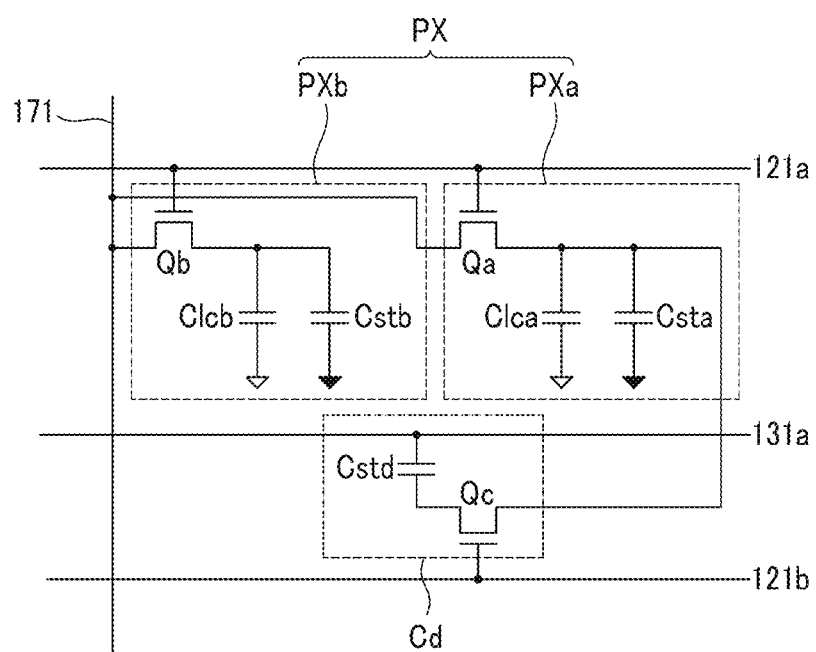
FIG. 16 is an equivalent circuit diagram of an exemplary embodiment of one pixel in the liquid crystal display of FIG. 15.

FIG. 16 is an equivalent circuit diagram of one pixel in the liquid crystal display according to the exemplary embodiment of FIG. 15. The structure and operation of the circuit diagram of the liquid crystal display illustrated in FIG. 15 will be described with reference to FIG. 16.

An exemplary embodiment of the liquid crystal display according to the includes the signal line including a first gate line 121a, a second gate line 121b, the storage electrode line 131, and data line 171 and the pixel connected therewith.

The pixel includes a first subpixel area PXa, a subpixel area PXb and a decompression portion Cd.

The first subpixel area PXa includes the first switching element Qa, the first liquid crystal capacitor Clca, and a first storage capacitor Csta. The second subpixel area PXb includes the second switching element Qb, the second liquid crystal capacitor Clcb and a second storage capacitor Cstb. The decompression portion Cd includes the third switching element Qc and the decompression capacitor Cstd.

The first and second switching elements Qa and Qb are the three terminal element such as the thin film transistor, and the like, that is formed on a lower panel of the liquid crystal display, and the control terminal thereof is connected with the first gate line 121a, the input terminal is connected with the data line 171, and the output terminal is connected with the first and second liquid crystal capacitors Clca and Clcb and the first and second storage capacitors Csta and Cstb, respectively.

The third switching element Qc is the three terminal element such as the thin film transistor, and the like, that is formed on the lower panel of the liquid crystal display, and the control terminal is connected with the second gate line 121b, the input terminal is connected with the first liquid crystal capacitor Clca, and the output terminal is connected with the decompression capacitor Cstd.

The first and second liquid crystal capacitors Clca and Clcb are each formed by overlapping the first and second subpixel electrodes 191a' and 191b' connected with the first and second switching elements Qa and Qb with the common electrode 270 of an upper panel of the liquid crystal display. The first and second storage capacitors Csta and Cstb are formed by overlapping the storage electrode line 131 with the first and second subpixel electrodes 191a' and 191b'.

As mentioned earlier, a wide end portion 177c of the third source electrode 173c overlaps a capacitive electrode 137 to form the depression capacitor Cstd. That is, the decompression capacitor Cstd is connected with the output terminal of the third switching element Qc and the storage electrode line 131. The storage electrode line 131 of the lower panel and the output terminal of the third switching element Qc overlap each other having an insulator disposed therebetween, to form the decompression capacitor Cstd.

An operation of the liquid crystal display illustrated in FIGS. 15 and 16 will be described below.

First, when the gate-on voltage Von is applied to the first gate line 121a, the first and second thin film transistors Qa and Qb connected therewith are turned on.

Therefore, the data voltage of the data line 171 is identically applied to the first and second subpixel electrodes 191a' and 191b' through the first and second switching elements Qa and Qb that are turned on. The first and second liquid crystal capacitors Clca and Clcb are charged by a difference between the common voltage Vcom of the common electrode 270 and the voltage of the first and second subpixel electrodes 191a' and 191b', such that the charging voltage of the first liquid crystal capacitor Clca is equal to the charging voltage of the second liquid crystal capacitor Clcb. Where the charging voltage of the first liquid crystal capacitor Clca is equal to the charging voltage of the second liquid crystal capacitor Clcb, the gate-off voltage Voff is applied to the second gate line 121b.

Next, when the gate-on voltage Von is applied to the second gate line 121b while the gate-off voltage Voff is applied to the first gate line 121a, the first and second switching element Qa and Qb connected with the first gate line 121a are turned off and the third switching element Qc is turned on. Therefore, the charge of the first subpixel electrode 191a' connected with the output terminal of the first switching element Qa flows in the decompression capacitor Cstd to reduce the voltage of the first liquid crystal capacitor Clca.

Where the exemplary embodiment of the liquid crystal display according to the invention is driven at a frame inversion and the data voltage having a positive (+) polarity based on the common voltage Vcom is applied to the data line 171 in the current frame is described as an example, the decompression capacitor Cstd is collected with a negative (−) charge after a previous frame ends. When the third switching element Qc is turned on in the current frame, the positive(+) charge of the first sub-pixel electrode 191a' flows in the decompression capacitor Cstd through the third switching element Qc, such that the positive charge is charged in the decompression capacitor Cstd and the voltage of the first liquid crystal capacitor Clca falls. On the other hand, the third switching element Qc is turned on in the state in which the negative (−) charge is charged in the first subpixel electrode 191a' in the next frame, such that the negative (−) charge of the first subpixel electrode 191a' flows in the decompression capacitor Cstd, such that the negative (−) charge is collected in the decompression capacitor Cstd and the voltage of the first liquid crystal capacitor Clca also falls.

As described above, according to one or more of the exemplary embodiments, the charging voltage of the first liquid crystal capacitor Clca may always be smaller than that of the second liquid crystal capacitor Clcb, regardless of the polarity of data voltage. Therefore, it is possible to improve the side visibility of the liquid crystal display by making the charging voltage of the first and second liquid crystal capacitors Clca and Clcb different.

The description of the exemplary embodiments of the liquid crystal display described in FIGS. 13 to 16 is only one example of a visibility structure for improving a side visibility. It will be understood that the structure of the thin film transistor and/or the pixel electrode design are not limited to the structure described in the exemplary embodiments, and may be variously modified so as to maintain the spirit and scope of the exemplary embodiments of the invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   a substrate;
   a thin film transistor on the substrate;
   a pixel electrode connected with a terminal of the thin film transistor through a contact hole;
   a common electrode facing the pixel electrode;
   a liquid crystal layer disposed in a microcavity provided in plural between the pixel electrode and the common electrode, in a pixel area;
   a supporting member on the common electrode, and
   a capping layer on the supporting member,
   wherein a groove is disposed between adjacent microcavities and exposes the liquid crystal layer,
   wherein the common electrode extends further than the microcavity to define a projection of the common electrode disposed in the groove between the adjacent microcavities,
   wherein the capping layer extends into the groove to contact the liquid crystal layer exposed at the groove and to contact the projection of the common electrode disposed in the groove, and to seal the adjacent microcavities, and
   wherein in the pixel area,
      the contact hole is disposed overlapping the microcavity, and
      the projection of the common electrode does not overlap the pixel electrode in a plan view.

2. The liquid crystal display of claim 1, wherein the projection of the common electrode is bent toward the substrate.

3. The liquid crystal display of claim 2, wherein a cross-sectional distance at which the projection of the common electrode protrudes toward the substrate is smaller than a thickness of the liquid crystal layer in the microcavity.

4. The liquid crystal display of claim 3, further comprising:
   an insulating layer on the common electrode,
   wherein an end portion of the insulating layer defines a projection thereof corresponding to the projection of the common electrode.

5. The liquid crystal display of claim 4, wherein the projection of the common electrode and the projection of the insulating layer overlap each other.

6. The liquid crystal display of claim 1, wherein the pixel electrode comprises:
   a cross-shape stem portion defined by a horizontal stem portion, and a vertical stem portion crossing the horizontal stem portion; and
   a plurality of branch portions extending from the cross-shape stem portion.

7. The liquid crystal display of claim 6, wherein the terminal of the thin film transistor connected with the pixel electrode is elongated in a same direction as that of the vertical stem portion of the pixel electrode.

8. The liquid crystal display of claim 7, wherein the contact hole is at an intersecting point at which the horizontal stem portion and the vertical stem portion intersect each other.

9. The liquid crystal display of claim 8, further comprising:
   a gate line on the substrate;
   a semiconductor layer comprising a channel region; and
   a data wire layer comprising a source electrode and a drain electrode overlapping an edge of the semiconductor layer; and a data line connected with the source electrode,
   wherein the semiconductor layer has a same plane shape as the data wire layer, except for the channel region.

10. The liquid crystal display of claim 9, further comprising:
    a light blocking pattern on the substrate, wherein the light blocking pattern is elongated in a same direction as that of the drain electrode.

11. The liquid crystal display of claim 10, wherein the light blocking pattern is at a same layer as the gate line.

12. The liquid crystal display of claim 1, further comprising:
    a gate line on the substrate and elongated in a first direction; and
    a data line elongated in a second direction crossing the first direction,
    wherein the groove is elongated in the first direction.

13. The liquid crystal display of claim 12, further comprising:
    an alignment film between the pixel electrode and the liquid crystal layer or between the common electrode and the liquid crystal layer.

14. A manufacturing method of a liquid crystal display, comprising: providing a thin film transistor on a substrate; providing a pixel electrode connected with a terminal of the thin film transistor through a contact hole; providing a sacrificial layer on the pixel electrode; providing a common electrode on the sacrificial layer; providing a supporting member on the common electrode; removing the sacrificial layer to form a microcavity provided in plural between the pixel electrode and the common electrode and to form a groove disposed between adjacent microcavities; injecting a liquid crystal material into the microcavity through the groove to form a liquid crystal layer in a pixel area and exposed at the groove; and providing a capping layer on the supporting member to cover the groove, wherein the common electrode extends further than the microcavity to define a projection of the common electrode disposed in the groove, wherein the capping layer extends into the groove to contact the liquid crystal layer exposed at the groove and contact the projection of the common electrode disposed in the groove, and to seal the adjacent microcavities, wherein the in the pixel area, the contact hole is disposed overlapping the microcavity which overlaps the pixel electrode, and the projection of the common electrode does not overlap the pixel electrode in plan view.

15. The method of claim 14, further comprising:
    patterning the supporting member to form the groove between the adjacent microcavities;
    providing an insulating layer on the supporting member; and
    patterning the insulating layer and the common electrode to expose the sacrificial layer.

16. The method of claim 15, wherein in the patterning of the insulating layer, the projection of the common electrode and a projection of the insulating layer are respectively protruded into the groove.

17. The method of claim 16, wherein the projections of the common electrode and the insulating layer are inclined toward the substrate after the forming of the microcavity.

18. The method of claim 17, wherein a cross-sectional distance at which the inclined projections of the common electrode and the insulating layer protrude toward the substrate is smaller than a thickness of the liquid crystal layer in the microcavity.

19. The method of claim 14, wherein the pixel electrode comprises:
    a cross-shape stem portion defined by a horizontal stem portion, and a vertical stem portion crossing the horizontal stem portion; and
    a plurality of branch portions extending from the cross-shape stem portion.

20. The method of claim 19, wherein:
    the terminal of the thin film transistor connected with the pixel electrode is elongated in a same direction as that of the vertical stem portion of the pixel electrode.

21. The method of claim 20, wherein:
    the contact hole is at an intersecting point at which the horizontal stem portion and the vertical stem portion intersect each other.

22. The method of claim 21, further comprising:
    providing a gate line on the substrate;
    providing a semiconductor layer comprising a channel region; and
    providing a data wire layer comprising a source electrode and a drain electrode overlapping an edge of the semiconductor layer, and a data line connected with the source electrode,
    wherein the semiconductor layer has a same plane shape as the data wire layer, except for the channel region.

23. The method of claim 22, further comprising:
    providing a light blocking pattern on the substrate, wherein the light blocking pattern is elongated in a same direction as that of the drain electrode.

24. The method of claim 23, wherein:
    the light blocking pattern is in a same layer as the gate line.

* * * * *